US011905893B2

United States Patent
Beddok et al.

(10) Patent No.: US 11,905,893 B2
(45) Date of Patent: Feb. 20, 2024

(54) METHOD AND SYSTEM FOR REGULATING A NON-PROPULSION ELECTRICAL GENERATION TURBOMACHINE

(71) Applicant: SAFRAN HELICOPTER ENGINES, Bordes (FR)

(72) Inventors: Stéphane Meyer Beddok, Moissy-Cramayel (FR); Vincent Poumarede, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 363 days.

(21) Appl. No.: 17/442,029

(22) PCT Filed: Mar. 20, 2020

(86) PCT No.: PCT/EP2020/057884
§ 371 (c)(1),
(2) Date: Sep. 22, 2021

(87) PCT Pub. No.: WO2020/200853
PCT Pub. Date: Oct. 8, 2020

(65) Prior Publication Data
US 2022/0178311 A1    Jun. 9, 2022

(30) Foreign Application Priority Data

Apr. 1, 2019   (FR) ..................... 1903434

(51) Int. Cl.
*F02C 9/26* (2006.01)
*B64D 31/00* (2006.01)
(Continued)

(52) U.S. Cl.
CPC ............... *F02C 9/26* (2013.01); *B64D 31/00* (2013.01); *B64D 41/00* (2013.01); *F02C 3/10* (2013.01); *B64D 2221/00* (2013.01)

(58) Field of Classification Search
CPC ... F02C 9/26; F02C 3/10; B64D 31/00; B64D 41/00; B64D 2221/00
See application file for complete search history.

(56) References Cited

U.S. PATENT DOCUMENTS 10,233,768 B1 *   3/2019   Watts, III ............... F01D 15/10
2018/0291807 A1   10/2018   Dalal

FOREIGN PATENT DOCUMENTS

CN     108691653 A  * 10/2018 ............... B60L 1/00
EP       2829472 A1  *  1/2015 ............. B64C 27/00
(Continued)

OTHER PUBLICATIONS

US2015028153A1_Original_document_20231108183536.pdf (Dalal) (Year: 2018).*

(Continued)

*Primary Examiner* — Jelani A Smith
*Assistant Examiner* — Christian T Eberhard
(74) *Attorney, Agent, or Firm* — KOS IP Law LLP

(57) ABSTRACT

A method for controlling a non-propulsive power generation turbine engine configured to supply power to a plurality of propulsion rotors of an aircraft, each propulsion rotor being connected to a power distribution module through at least one power supply bus, the turbine engine supplying each power supply bus via the power distribution module at a supply rate, the control method comprising a step of determining the power requirement of each power supply bus depending on the power requirement of each propulsion rotor, a step of determining the basic power requirement of each power supply bus, a step of determining the overall power requirement based on all the basic power requirements of the power supply buses and a step of determining an anticipation parameter based on the overall power requirement.

9 Claims, 3 Drawing Sheets

(51) Int. Cl.
  *B64D 41/00*   (2006.01)
  *F02C 3/10*    (2006.01)

(56) References Cited

FOREIGN PATENT DOCUMENTS

EP        2829472 A1      1/2015
EP        3357810 A1 *    8/2018   ........... B64C 13/503

OTHER PUBLICATIONS

EP3357810A1_Original_document_20231108183402.pdf (Covington) (Year: 2018).*
US2018291807A1_Original_document_20231108183303.pdf (Rossotto) (Year: 2015).*
Search Report from the French Intellectual Property Office on corresponding FR application (FR1903434) dated Jan. 13, 2020.
International Search Report and Written Opinion on corresponding PCT application (PCT/EP2020/057884) from International Searching Authority (EPO) dated May 4, 2020.

* cited by examiner

METHOD AND SYSTEM FOR REGULATING A NON-PROPULSION ELECTRICAL GENERATION TURBOMACHINE

TECHNICAL FIELD

The present invention relates to the field of the propulsion of an aircraft comprising several propulsion rotors, in particular, a plurality of propulsion rotors electrically supplied by a non-propulsion electrical generation turbomachine.

In a known manner, it has been proposed to equip an aircraft with a hybrid propulsion system comprising a non-propulsion electrical generation turbomachine, a battery and a plurality of electrically supplied rotors. Such a hybrid propulsion system makes it possible to transport goods and merchandise in an optimal manner while limiting noise nuisance and fuel consumption.

The use of a hybrid propulsion system poses drawbacks from the point of view of the regulation of the turbomachine given that the latter is no longer propulsive but dedicated to the generation of electrical energy.

In a known manner, a so-called "double body" or "free turbine" propulsion turbomachine comprises a high-pressure shaft, having a high-pressure rotation speed $N1$, which notably drives the compressor, and a low-pressure shaft, having a low-pressure rotation speed $N2$, which forms the output shaft. In a known manner, the low-pressure shaft is connected to a free turbine, which mechanically drives through a reduction stage a propulsion rotor comprising a plurality of blades, the collective pitch of which may be modified. In a known manner, the collective pitch corresponds to the angle of incidence common to all of the blades of said propulsion rotor.

In an aircraft according to the prior art comprising a propulsion turbomachine, a regulation system configured to limit the variations in low-pressure rotation speed $N2$ in such a way as to ensure the pilotability of the aircraft, while controlling the flow rate of fuel as well as the high-pressure rotation speed $N1$ in order to allow the turbomachine to operate at optimal efficiency is known.

Thanks to a throttle regulation called "collective pitch control", the pilot of the aircraft can modify the incidence of the blades of the rotor and modify the mechanical torque exerted by said rotor on the low-pressure shaft. The modification of the collective pitch thus leads to a variation in the power requirements of the propulsion turbomachine.

The regulation system must thus enslave the low-pressure rotation speed $N2$ independently of the power requirement imposed by the pilot by means of the collective pitch. To do so, the regulation system of the propulsion turbomachine can act on two operating parameters: on the one hand the flow rate of fuel injected into the combustion chamber, on the other hand the high-pressure rotation speed $N1$ of the compressor, which conditions the flow rate of air introduced into the combustion chamber and may be considered as an image of the power supplied by the turbomachine on the low-pressure shaft.

In practice, as illustrated in FIG. 1 schematically representing a system for regulating a propulsion turbomachine $T1$, the regulation system of the turbomachine $T1$ is based on two nested control loops: a control loop of the low-pressure rotation speed $N2$ and a control loop of the high-pressure rotation speed $N1$.

The regulation system receives in input a rotation speed set point $N2c$ which is compared with the low-pressure rotation speed $N2$ of the turbomachine $T1$ in order to determine a difference in low-pressure rotation speed $\varepsilon N2$. A preliminary high-pressure parameter $N1pc$ is determined by a low-pressure corrector $CN2$, of the integral proportional type, from the difference in low-pressure rotation speed $\varepsilon N2$. A high-pressure rotation speed set point $N1c$ is determined by adding the preliminary high-pressure parameter $N1pc$ to an anticipation parameter $N1a$. Then, the high-pressure rotation speed set point $N1c$ is compared with the high-pressure rotation speed $N1$ of the turbomachine in order to determine a difference in high-pressure rotation speed $\varepsilon N1$. A quantity of fuel $Qc$ is determined by a high-pressure corrector $CN1$, of the integral proportional type, from the difference in high-pressure rotation speed $\varepsilon N1$. Thus, the turbomachine $T1$ receives an optimal quantity of fuel $Qc$ to limit the variation in low-pressure rotation speed $N2$.

The use of an anticipation parameter $N1a$ is important in the regulation because this makes it possible to take into account, by anticipation, a modification of the collective pitch $XPC$ which leads to a variation in the power requirements of the turbomachine $T1$. In practice, the anticipation parameter $N1a$ is determined by a calculation module 20 from a measurement of the collective pitch $XPC$ of the blades of the rotor of the aircraft. Indeed, the collective pitch $XPC$ is an advanced indicator of the power requirements of the turbomachine $T1$ and makes it possible to realize an optimal and precise regulation over time. To enable such a regulation, the turbomachine $T1$ is equipped with a collective pitch measurement device $XPC$ in order to be able to determine the anticipation parameter $N1a$. The calculation module 20 is generally in the form of a mathematical model defined as a function of the physical characteristics of the rotor, the pressure conditions and the air temperature (density), and reset empirically through feedback, notably, from flight tests.

In the case of an aircraft comprising a non-propulsion electrical generation turbomachine, the turbomachine is not mechanically connected to the rotor of the aircraft but electrically to a plurality of propulsion rotors. It is thus no longer possible to determine an anticipation parameter as in the prior art.

An immediate solution would be to measure the collective pitch of each electric rotor, which is complex and costly given that each rotor would have to be equipped with a collective pitch measurement device $XPC$.

Further, a measurement of the collective pitch of each electric rotor is not relevant given that the constraints for a multi-rotor architecture are different from those of a mono-rotor architecture. In particular, in a multi-rotor architecture, it is possible to modify the collective pitch of each rotor but also its speed of rotation independently, which is not possible in a mono-rotor architecture.

The present invention aims to propose a novel regulation system suitable for a multi-rotor architecture which can draw benefit from the advantages of a regulation system for a mono-rotor architecture.

SUMMARY

A method for regulating a non-propulsion electrical generation turbomachine configured to supply electrically a plurality of propulsion rotors of an aircraft, each propulsion rotor being connected to an energy distribution module by at least one supply bus, the turbomachine supplying each supply bus via the energy distribution module according to a supply rate, the turbomachine comprising a high-pressure shaft, having a high-pressure rotation speed $N1$, a low-pressure shaft, having a low-pressure rotation speed N2, the regulation method comprising:
- a step of determining the power requirement of each propulsion rotor,
- a step of determining the power requirement of each supply bus as a function of the power requirement of each propulsion rotor,
- a step of determining the elementary power requirement of each supply bus as a function of the supply rate and the power requirement of each supply bus,
- a step of determining the overall power requirement from all of the elementary power requirements of the supply buses,
- a step of determining an anticipation parameter from the overall power requirement,
- a step of determining a high-pressure rotation speed set point from a low-pressure rotation speed set point and from a measurement of the low-pressure rotation speed of the turbomachine and of said anticipation parameter and
- a step of determining a fuel flow rate set point of the turbomachine from the high-pressure rotation speed set point and from a measurement of the high-pressure rotation speed.

Advantageously, thanks to the invention, advantage is taken from a known method for regulating a propulsion turbomachine to regulate a non-propulsion energy generation turbomachine. An anticipation parameter, based on the impact of the overall electrical power requirement of the propulsion rotors, enables a rapid, reliable and relevant regulation. The taking into account of the supply rate is also relevant given that all the electrical energy is not supplied by the turbomachine. The electrical energy requirements are thus determined in an anticipated and reliable manner.

Advantageously, the turbomachine drives at least one electrical generator, preferably a plurality of electrical generators, to supply the energy distribution module. Preferably, the low-pressure shaft drives at least one electrical generator, preferably, a plurality of electrical generators. Although not having any mechanical link with the propulsion rotors of the aircraft, the low-pressure shaft of the non-propulsion energy generation turbomachine drives, either directly, or through a mechanical reduction stage, a plurality of electrical generators, which are characterized by a nominal drive speed making it possible to ensure optimal operation of said electrical generators. This optimal drive speed depends notably on the technology and the topology of the electrical generation rotor members. In the same way as in the case of a propulsion turbomachine driving the propulsion rotor of an aircraft, the regulation of a non-propulsion energy generation turbomachine must thus enslave the low-pressure rotation speed N2, and limit its fluctuations vis-à-vis variations in electrical power consumed by the electrical propulsion system of the aircraft.

Preferably, the energy distribution module is configured to supply each supply bus by the turbomachine and by a battery. Preferably, each supply bus is exclusively supplied by the battery and the turbomachine. The supply rate varies as a function of different parameters, for example, the state of charge of the battery.

Preferably, the power requirement of a propulsion rotor is determined as a function of at least one of the following parameters of said propulsion rotor: the thrust, the rotation speed and the pitch of said propulsion rotor. In other words, the anticipation parameter makes it possible to take into account the diverse nature of propulsion rotors as well as their control which may be diverse (variation in the collective pitch, the rotation speed, etc.). Preferably, the power requirement of a propulsion rotor is determined as a function of several, preferably all, of the parameters cited.

According to an aspect of the invention, at least two propulsion rotors are electrically connected to the energy distribution module by a same supply bus. Thus, this makes it possible to share the supply bus. Preferably, at least two supply buses are electrically connected to a same propulsion rotor in order to realize a redundant supply and thus improve safety.

Preferably, the supply bus supplying at least two propulsion rotors as a function of predetermined sharing rates, the method comprises a step of determining the elementary power requirement of said supply bus as a function of the power requirement of each propulsion rotor connected to said supply bus, from predetermined sharing rates and the supply rate of said supply bus.

Preferably, the anticipation parameter is determined from a database receiving in input the overall power requirement. Thus, the overall power requirement is directly associated with an anticipation parameter in the manner of the collective pitch according to the prior art. The determination is direct and rapid.

The invention also relates to a system for regulating a non-propulsion electrical generation turbomachine configured to supply electrically a plurality of propulsion rotors of an aircraft, each propulsion rotor being connected to an energy distribution module by at least one supply bus, the turbomachine supplying each supply bus via the energy distribution module according to a supply rate, the turbomachine comprising a high-pressure shaft, having a high-pressure rotation speed N1, and a low-pressure shaft, having a low-pressure rotation speed N2, the regulation system comprising:
- a power determination module configured to determine the power requirement of each propulsion rotor,
- an anticipation module configured to determine:
  - a power requirement of each supply bus as a function of the power requirement of each propulsion rotor,
  - an elementary power requirement of each supply bus as a function of the supply rate and the power requirement of each supply bus,
  - an overall power requirement from all of the elementary power requirements of the supply buses,
  - an anticipation parameter from the overall power requirement,
- a regulation module configured to determine:
  - a high-pressure rotation speed set point from a low-pressure rotation speed set point and from a measurement of the low-pressure rotation speed of the turbomachine and of said anticipation parameter and
  - a fuel flow rate set point of the turbomachine from the high-pressure rotation speed set point and from a measurement of the high-pressure rotation speed.

The invention also relates to a non-propulsion electrical generation turbomachine configured to electrically supply a plurality of propulsion rotors of an aircraft, the turbomachine comprising a high-pressure shaft, having a high-pressure rotation speed N1, and a low-pressure shaft, having a low-pressure rotation speed N2, the turbomachine comprising a regulation system such as described previously.

The invention further relates to an aircraft comprising a plurality of propulsion rotors, at least one energy distribution module, at least one supply bus connecting each propulsion rotor to the energy distribution module, a turbomachine, such as described previously, supplying each supply bus via the energy distribution module according to a supply rate.

BRIEF DESCRIPTION OF THE DRAWINGS

The invention will be better understood after reading the following description, given as an example and with reference to the following figures given as non-limitative examples, wherein identical references are given to similar objects and in which.

It should be noted that the figures present the invention in a detailed manner so that the invention can be put into practice, obviously said figures can be used to better define the invention if necessary.

DETAILED DESCRIPTION

Figure 1:
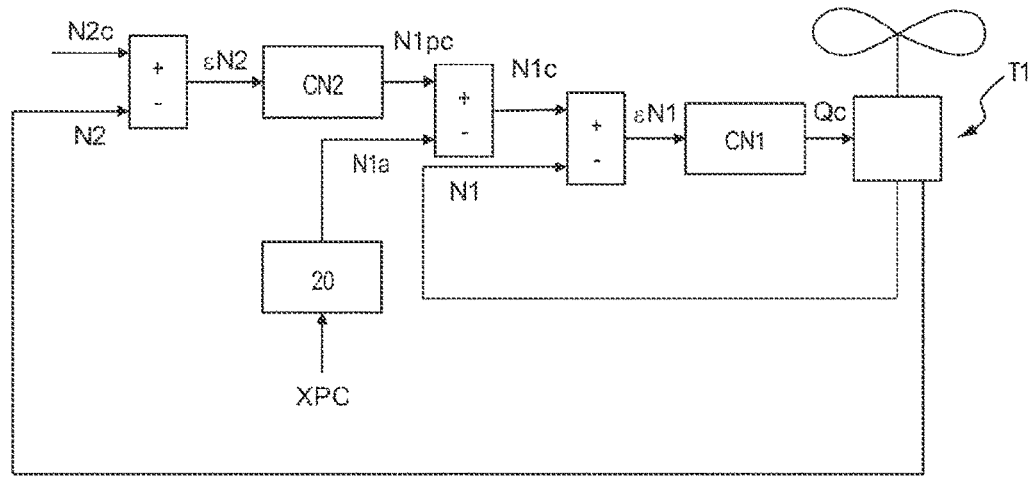
FIG. 1 is a schematic representation of a system for regulating a propulsion turbomachine according to the prior art.
Figure 2:
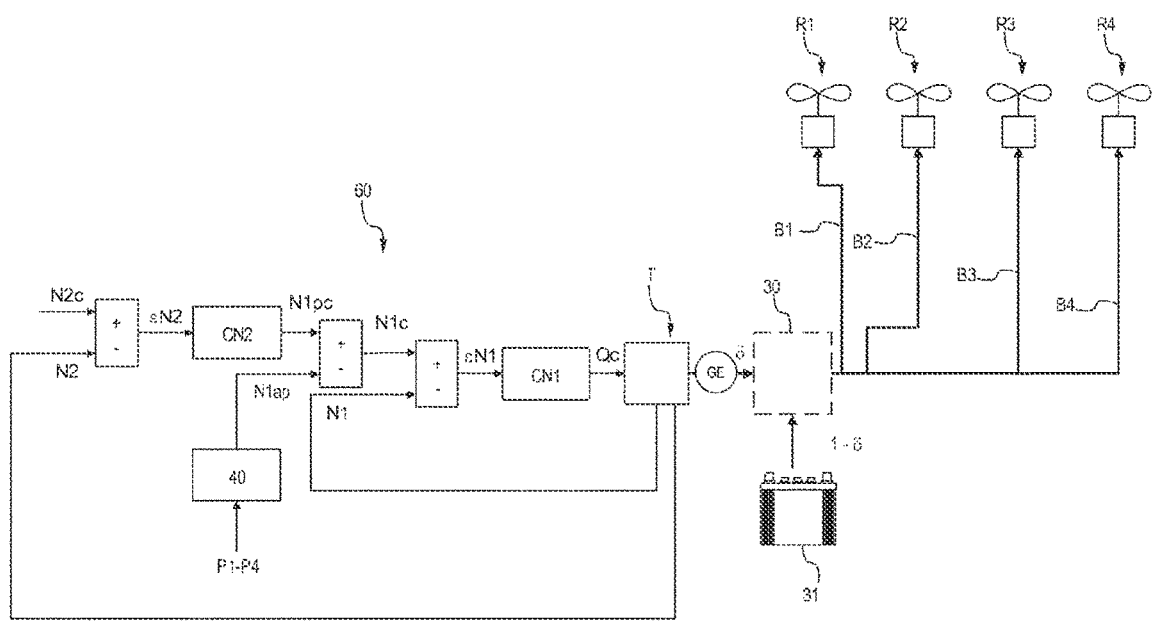
FIG. 2 is a schematic representation of a system for regulating a non-propulsion electrical generation turbomachine for supplying a plurality of propulsion rotors according to the invention.

With reference FIG. 2, a multi-rotor architecture of an aircraft, in particular, a helicopter, is represented in a schematic manner. In this example, the aircraft comprises a plurality of propulsion rotors R1-R4 electrically supplied by a distribution module 30 itself supplied by a non-propulsion electrical generation turbomachine T and an electric battery 31. Electric battery 31 is taken to mean not just a single electric battery 31 but also a set of several batteries 31. In this example, 4 propulsion rotors R1-R4 are represented but it goes without saying that their number could be different. The aircraft comprises a flight control system to control the propulsion rotors R1-R4.

Each propulsion rotor R1-R4 is connected to the energy distribution module 30 by one or more supply buses B1-B4. In the first embodiment of FIG. 2, each propulsion rotor R1-R4 is connected to the energy distribution module 30 by a single supply bus B1-B4.

The distribution module 30 is supplied by a plurality of electrical generators GE driven by the turbomachine T. Each supply bus B1-B4 is supplied by the turbomachine as a function of the supply rate $\delta1$-$\delta4$. In other words, for the first supply bus B1, the supply rate $\delta1$ corresponds to the share of the turbomachine T in the electrical supply of the first supply bus B1. In a reciprocal manner, the supply rate 1-$\delta1$ corresponds to the share of the battery 31 in the electrical supply of the first supply bus B1. For each supply bus B1-B4, the supply rate $\delta1$-$\delta4$ can vary over time and with the operating conditions. As an example, when the supply rate $\delta1$ is equal to 0, only the battery 31 supplies the first supply bus B1. Conversely, when the supply rate $\delta1$ is equal to 1, only the turbomachine T supplies the first supply bus B1. In addition, the turbomachine T can supply alone the first supply bus B1 but also recharge the battery 31. In other words, the turbomachine T can generate more energy than that demanded by the supply buses B1-B4 in order to recharge the battery 31.

Still with reference to FIG. 2, a system for regulating the non-propulsion electrical generation turbomachine T according to an embodiment of the invention is represented. In a known manner, the turbomachine T comprises a high-pressure shaft having a high-pressure rotation speed N1 and a low-pressure shaft having a low-pressure rotation speed N2.

In a known manner, the turbomachine comprises a compressor which is driven by the high-pressure shaft. The low-pressure shaft drives the plurality of electrical generators GE in order to supply the distribution module 30.

In a manner analogous to the prior art, the regulation system of the turbomachine T comprises a regulation module 60 based on two nested control loops: a control loop of the low-pressure rotation speed N2 and a control loop of the high-pressure rotation speed N1.

The regulation module 60 receives in input a rotation speed set point N2c which is compared with the low-pressure rotation speed N2 of the turbomachine T in order to determine a difference in low-pressure rotation speed $\varepsilon$N2. A preliminary high-pressure rotation speed N1$pc$ is determined by a low-pressure corrector CN2, of the integral proportional type, from the difference in low-pressure rotation speed $\varepsilon$N2. A high-pressure rotation speed set point N1$c$ is determined by adding the preliminary high-pressure parameter N1$pc$ to an anticipation parameter N1$ap$. Then, the high-pressure rotation speed set point N1$c$ is compared with the high-pressure rotation speed N1 of the turbomachine in order to determine a difference in high-pressure rotation speed parameter EN1. A quantity of fuel Qc is determined by a high-pressure corrector CN1, of the integral proportional type, from the difference in high-pressure rotation speed $\varepsilon$N1. Advantageously, the anticipation parameter N1$ap$ is determined in such a way that the turbomachine T receives an optimal quantity of fuel Qc to limit the variation in low-pressure rotation speed N2.

According to the invention, the anticipation parameter N1$ap$ is a function of the overall power requirement Pglob which is determined from the elementary power requirements PB1$e$-PB4$e$ of the supply buses B1-B4. Hereafter, elementary power is taken to mean the power taken from the turbomachine T by each supply bus B1-B4 as will be described hereafter.

According to the invention, the regulation system comprises an anticipation module 40 configured to determine the anticipation parameter N lap from the power requirements P1-P4 of each propulsion rotor R1-R4.

Figure 3:
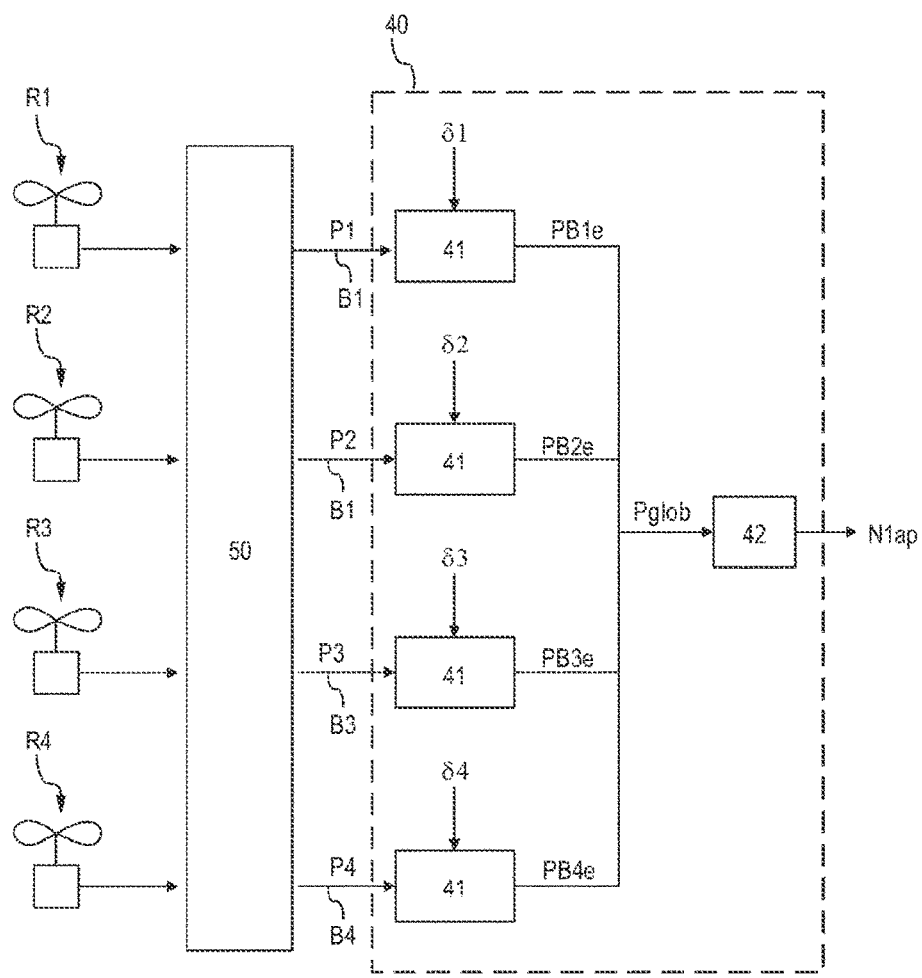
FIG. 3 is a schematic representation of an anticipation module of a regulation system.

With reference to FIG. 3, the power requirements P1-P4 of each propulsion rotor R1-R4 are determined by a power determination module 50 from different parameters specific to each propulsion rotor R1-R4, in particular, the rotation speed, the pitch, the atmospheric conditions, the speed of the aircraft, etc. Preferably, the power determination module 50 is in the form of an electronic calculator connected to sensors measuring the specific parameters of each propulsion rotor R1-R4.

As illustrated in FIG. 3, the anticipation module 40 comprises a first sub-module 41 configured to determine an elementary power requirement PB1$e$-PB4$e$ of each supply bus PB1-PB4 from the supply rate $\delta1$-$\delta4$ of said supply bus B1-B4 and the power requirement P1-P4 of said propulsion rotor R1-R4 according to the following formula:

$$PBe = P * \delta$$

The elementary power requirement PB1$e$-PB4$e$ represents the impact in electrical power requirement of each propulsion rotor R1-R4. In this example, the elementary power requirement PB1$e$-PB4$e$ of a supply bus PB1-PB4 corresponds to the power requirement P1-P4 of the propulsion rotor R1-R4 to which it is connected.

The anticipation module 40 is configured to determine an overall power requirement Pglob from all of the elementary power requirements PBe1-PBe4. In this example, the overall power requirement Pglob is obtained by addition of the elementary power requirements PBe1-PBe4.

Still with reference to FIG. 3, the anticipation module 40 comprises a database 42 configured to associate an overall power requirement Pglob with an anticipation parameter N1ap. Preferably, the database 42 is defined empirically or by calculation (mathematical model, mathematical function, etc.).

The anticipation parameter N1ap is introduced into the regulation module 60 instead of the anticipation parameter according to the prior art that was defined from the collective pitch of the rotor of the aircraft. Advantageously, to regulate the turbomachine T, the regulation module 60 remains identical for a mono-rotor architecture and a multi-rotor architecture, only the anticipation parameter N1ap is adapted. Thus, any improvement to the regulation system benefits all architectures.

The definition of the anticipation parameter N1ap is wise given that it corresponds to the power requirement demanded from the non-propulsion turbomachine T. Advantageously, such a parameter is analogous to the parameter calculated from the collective pitch for a propulsion turbomachine mechanically driving the rotor of the aircraft.

When the aircraft is in flight, the flight control system of the aircraft controls the different propulsion rotors R1-R4 in order to displace the aircraft. The propulsion rotors R1-R4 are supplied by the turbomachine T and by the battery 31 as a function of their respective supply rates $\delta 1$-$\delta 4$. The power determination module 50 makes it possible to determine the power requirement P1-P4. From these power requirements P1-P4, the anticipation module 40 determines the overall power requirement Pglob which impacts the turbomachine T and deduces therefrom an anticipation parameter N1ap which is used to regulate the low-pressure rotation speed N2 and limit variations in the latter. The turbomachine T is used in an optimal manner, which limits its fuel consumption.

Figure 4:
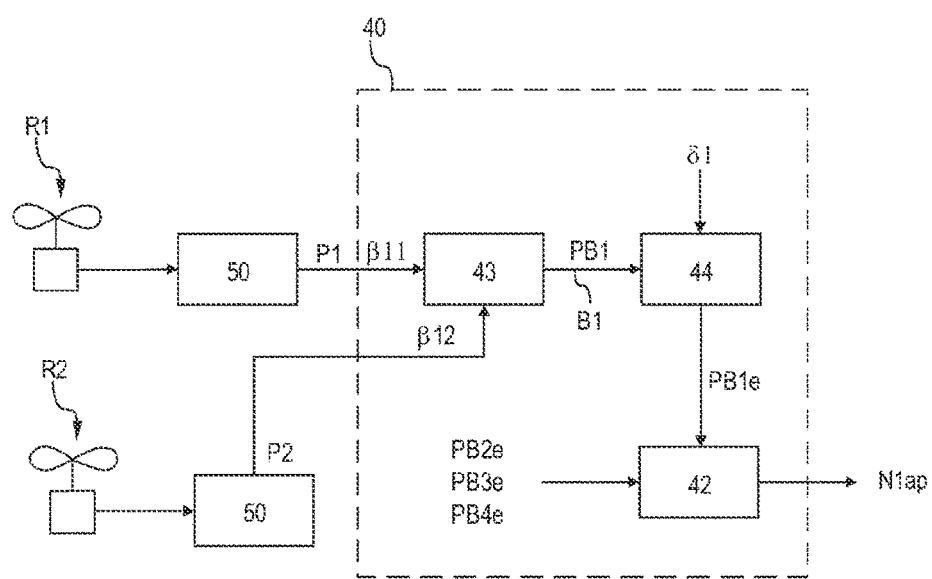
FIG. 4 is a schematic representation of an anticipation module for several propulsion rotors shared on a same supply bus.

In a second embodiment, as illustrated in FIG. 4, several propulsion rotors R1-R4 are connected to the distribution module 30 by a same supply bus B1-B4. In addition, a same propulsion rotor R1-R4 is electrically connected to several supply buses B1-B4 in such a way as to enable redundancy, improving reliability in the event of failure.

In an analogous manner to previously, the power determination module 50 determines the power requirement P1-P4 of each propulsion rotor R1-R4 from different parameters specific to each propulsion rotor R1-R4, in particular, the rotation speed, the pitch, the atmospheric conditions, the speed of the aircraft, etc.

Hereafter, the example is described of a single supply bus B1 which is shared with two rotors R1, R2. It goes without saying that their number could be different.

In this example, the supply bus B1 supplies the propulsion rotors R1, R2 as a function of predetermined sharing rates $\beta 11$, $\beta 12$. In this example, with reference to FIG. 4, the first supply bus B1 supplies to the first propulsion rotor R1 a power $\beta 11 * P1$ and to the second propulsion rotor R2 a power $\beta 12 * P2$. In other words, the total power of the supply bus PB1 is defined in the following manner:

$$PB1 = \beta 11 * P1 + \beta 12 * P2$$

In an analogous manner to previously, each supply bus B1-B4 is supplied directly by the turbomachine T as a function of a supply rate $\delta 1$-$\delta 4$ by driving of the electrical generators GE. The elementary power requirement PB1e-PB4e of each supply bus B1-B4 is determined as a function of the supply rate $\delta 1$-$\delta 4$ and the power requirement of the bus PB1-PB4.

In this example, with reference to FIG. 4, the elementary power requirement PB1e of the first supply bus PB1 is defined in the following manner:

$$PB1e = \delta 1 * (\beta 11 * P1 + \beta 12 * P2)$$

In an analogous manner to previously, the overall power requirement Pglob is deduced by adding together the elementary power requirements PB1e-PB4e in order to determine the anticipation parameter N1ap.

In other words, the invention makes it possible to determine a relevant anticipation parameter N1ap not just when the supply buses B1-B4 are independent but also when they are shared to increase redundancy.

Thanks to the invention, a non-propulsion turbomachine T is regulated in an optimal manner by using in part the regulation system developed in the prior art for a propulsion turbomachine.

The invention claimed is:

1. A method for regulating a non-propulsion electrical generation turbomachine configured to supply electrically a plurality of propulsion rotors of an aircraft, each propulsion rotor being connected to an energy distribution module by at least one supply bus, the turbomachine supplying each supply bus via the energy distribution module according to a supply rate, the turbomachine comprising a high-pressure shaft and having a high-pressure rotation speed N1, and a low-pressure shaft, having a low-pressure rotation speed N2, the regulation method comprising:
   a step of determining the power requirement of each propulsion rotor,
   a step of determining the power requirement of each supply bus as a function of the power requirement of each propulsion rotor,
   a step of determining the elementary power requirement of each supply bus as a function of the supply rate and the power requirement of each supply bus,
   a step of determining the overall power requirement from all of the elementary power requirements of the supply buses,
   a step of determining an anticipation parameter from the overall power requirement,
   a step of determining a high-pressure rotation speed set point from a low-pressure rotation speed set point and from a measurement of the low-pressure rotation speed of the turbomachine and of said anticipation parameter, and
   a step of determining a fuel flow rate set point of the turbomachine from the high-pressure rotation speed set point and from a measurement of the high-pressure rotation speed.

2. The method for regulating according to claim 1, wherein the energy distribution module is configured to supply each supply bus by the turbomachine and by a battery.

3. The method for regulating according to claim 1, wherein the power requirement of a propulsion rotor is determined as a function of at least one of the following parameters of said propulsion rotor: the thrust, the rotation speed and the pitch of said propulsion rotor.

4. The method for regulating according to claim 1, wherein at least two propulsion rotors are electrically connected to the energy distribution module by the same supply bus.

5. The method for regulating according to claim 4, wherein, the supply bus supplying at least two propulsion rotors as a function of predetermined sharing rates, the method comprises a step of determining the elementary power requirement of said supply bus as a function of the power requirement of each propulsion rotor connected to said supply bus, the predetermined sharing rates and the supply rate of said supply bus.

6. The method for regulating according to claim 1, wherein the anticipation parameter is determined from a database receiving in input the overall power requirement.

7. A system for regulating a non-propulsion electrical generation turbomachine configured to supply electrically a plurality of propulsion rotors of an aircraft, each propulsion rotor being connected to an energy distribution module by at least one supply bus, the turbomachine supplying each supply bus via the energy distribution module according to a supply rate, the turbomachine comprising a high-pressure shaft, having a high-pressure rotation speed N1, and a low-pressure shaft, having a low-pressure rotation speed N2, the regulation system comprising:
   a power determination module configured to determine the power requirement of each propulsion rotor,
   an anticipation module configured to determine:
      i. a power requirement of each supply bus as a function of the power requirement of each propulsion rotor,
      ii. an elementary power requirement of each supply bus as a function of the supply rate and the power requirement of each supply bus,
      iii. an overall power requirement from all of the elementary power supply requirements of the supply buses,
      iv. an anticipation parameter from the overall power requirement,
   a regulation module configured to determine:
      i. a high-pressure rotation speed set point from a low-pressure rotation speed set point and from a measurement of the low-pressure rotation speed of the turbomachine and of said anticipation parameter, and
      ii. a fuel flow rate set point of the turbomachine from the high-pressure rotation speed set point and from a measurement of the high-pressure rotation speed.

8. A non-propulsion electrical generation turbomachine configured to supply electrically a plurality of propulsion rotors of an aircraft, the turbomachine comprising a high-pressure shaft, having a high-pressure rotation speed N1, and a low-pressure shaft, having a low-pressure rotation speed N2, the turbomachine comprising the system for regulating according to claim 7.

9. An aircraft comprising a plurality of propulsion rotors, at least one energy distribution module, at least one supply bus connecting each propulsion rotor to the energy distribution module, the turbomachine according to claim 8 supplying each supply bus via the energy distribution module according to a supply rate.

* * * * *